US008863741B2

(12) United States Patent
MacKay et al.

(10) Patent No.: US 8,863,741 B2
(45) Date of Patent: Oct. 21, 2014

(54) SOLAR AIR HEATING DEVICE

(76) Inventors: Cameron R MacKay, Surrey (CA); Harley E Kelsey, Vancouver (CA)

(*) Notice: Subject to any disclaimer, the term of this patent is extended or adjusted under 35 U.S.C. 154(b) by 483 days.

(21) Appl. No.: 13/082,680

(22) Filed: Apr. 8, 2011

(65) Prior Publication Data
US 2011/0180058 A1    Jul. 28, 2011

(51) Int. Cl.
*F24J 2/00* (2014.01)
*F24J 2/04* (2006.01)
*F24J 2/05* (2006.01)

(52) U.S. Cl.
CPC .............. *F24J 2/0488* (2013.01); *F24J 2/0494* (2013.01); *F24J 2/05* (2013.01); *Y02E 10/44* (2013.01)
USPC ........... 126/702; 126/600; 126/625; 126/627; 126/628; 126/658

(58) Field of Classification Search
USPC ......... 126/624, 625, 627, 634, 647, 648, 649, 126/658, 701, 702, 628
See application file for complete search history.

(56) References Cited

U.S. PATENT DOCUMENTS

| | | | |
|---|---|---|---|
| 682,658 A * | 9/1901 | Wishart .................... 126/634 |
| 2,907,318 A * | 10/1959 | Awot ...................... 126/658 |
| 3,022,549 A * | 2/1962 | Cummings ................. 49/64 |
| 3,923,381 A | 12/1975 | Winston |
| 3,940,896 A * | 3/1976 | Steel ....................... 52/307 |
| 3,971,359 A | 7/1976 | Bourne |
| 3,996,918 A * | 12/1976 | Quick ...................... 126/649 |
| 4,034,736 A | 7/1977 | Telkes |
| 4,036,208 A * | 7/1977 | Bauer ...................... 126/658 |
| 4,050,443 A * | 9/1977 | Peck et al. ................. 126/629 |
| 4,054,125 A * | 10/1977 | Eckels ..................... 126/633 |
| 4,058,109 A | 11/1977 | Gramm |
| 4,061,129 A * | 12/1977 | Wilson .................... 126/619 |
| 4,079,724 A * | 3/1978 | Zwillinger ................. 126/658 |
| 4,090,494 A * | 5/1978 | Borst et al. ................ 126/667 |
| 4,092,977 A | 6/1978 | Gurtler et al. |
| 4,092,978 A * | 6/1978 | Levine .................... 126/675 |
| 4,111,185 A * | 9/1978 | Swann ..................... 126/629 |

(Continued)

FOREIGN PATENT DOCUMENTS

| | | |
|---|---|---|
| CN | 101307958 | 11/2008 |
| CN | 201331196 | 10/2009 |

(Continued)

OTHER PUBLICATIONS

Weerakoon, Avinda, Peter Richards, Ian McClew, and Joe Deans; "Use of Perforated Metal Sheets as Solar Collectors for Building Space Heating" Department of Mechanical Engineering, University of Auckland. EcoLibrium (Aug. 2004) p. 24-28.

*Primary Examiner* — Jorge Pereiro
(74) *Attorney, Agent, or Firm* — Sampson & Associates, P.C.

(57) ABSTRACT

A solar air heating module is provided including an air entrance situated proximate to a bottom of the module and an air exit situated proximate to the top of the module; a back film, having a plurality of conical solar collectors extending perpendicularly therefrom; a front film in contact with the collectors to prevent air from escaping between the entrance and the exit; wherein air, when entering the entrance, passes by the collectors to mix with heated air before reaching the exit. Alternatively the collectors may be aligned wherein each collector is secured to adjacent collectors by plates or a strap to allow the module to be folded or rolled up for storage.

15 Claims, 17 Drawing Sheets

(56) References Cited

U.S. PATENT DOCUMENTS

| | | | | |
|---|---|---|---|---|
| 4,112,918 A | | 9/1978 | Palkes | |
| 4,117,829 A | | 10/1978 | Gross et al. | |
| 4,137,098 A | * | 1/1979 | Field | 136/248 |
| 4,138,997 A | * | 2/1979 | LaPorte et al. | 126/658 |
| 4,143,640 A | * | 3/1979 | Pierce | 126/600 |
| 4,159,707 A | | 7/1979 | Miquel | |
| 4,164,718 A | * | 8/1979 | Iwasaki | 333/81 R |
| 4,186,722 A | | 2/1980 | Muessig | |
| 4,207,868 A | | 6/1980 | Peterson | |
| 4,212,289 A | | 7/1980 | Hebert | |
| 4,215,673 A | * | 8/1980 | Cohen | 126/587 |
| 4,220,139 A | * | 9/1980 | Ramsden | 126/595 |
| 4,245,435 A | * | 1/1981 | Ulbricht | 49/64 |
| 4,248,211 A | * | 2/1981 | Womack | 126/658 |
| 4,258,702 A | * | 3/1981 | Harrison | 126/702 |
| 4,262,657 A | | 4/1981 | McCullough et al. | |
| 4,296,734 A | | 10/1981 | Nevins | |
| 4,304,218 A | | 12/1981 | Karlsson | |
| 4,307,712 A | * | 12/1981 | Tracy | 126/606 |
| 4,312,328 A | * | 1/1982 | Leyman, III | 126/627 |
| 4,323,053 A | | 4/1982 | McCullough et al. | |
| 4,323,054 A | | 4/1982 | Hummel | |
| 4,324,231 A | | 4/1982 | Reinert | |
| 4,327,707 A | * | 5/1982 | Wilhelm | 126/627 |
| 4,334,524 A | | 6/1982 | McCullough et al. | |
| 4,343,297 A | * | 8/1982 | Figge | 126/647 |
| 4,345,585 A | * | 8/1982 | Ellis | 126/632 |
| 4,351,320 A | * | 9/1982 | Tetirick | 126/607 |
| 4,378,786 A | | 4/1983 | Comeau, Jr. | |
| 4,411,256 A | * | 10/1983 | Fleming | 126/649 |
| 4,420,756 A | | 12/1983 | Hamada et al. | |
| 4,435,919 A | * | 3/1984 | Poisson | 49/63 |
| 4,471,761 A | | 9/1984 | Pearson et al. | |
| 4,489,709 A | | 12/1984 | Balzer | |
| 4,498,458 A | * | 2/1985 | Soper | 126/628 |
| 4,527,548 A | | 7/1985 | Gustafson | |
| 4,534,335 A | | 8/1985 | Rice | |
| 4,557,310 A | * | 12/1985 | Castellaw et al. | 160/84.06 |
| 4,577,619 A | * | 3/1986 | Howe, Jr. | 126/629 |
| 4,713,492 A | * | 12/1987 | Hanak | 136/245 |
| 4,716,882 A | | 1/1988 | Ishida | |
| 4,774,932 A | * | 10/1988 | Hollick | 126/632 |
| 4,846,151 A | | 7/1989 | Simko, Jr. | |
| 4,867,133 A | * | 9/1989 | Sadler | 126/663 |
| 4,926,933 A | * | 5/1990 | Gray | 165/173 |
| 5,221,363 A | | 6/1993 | Gillard | |
| 5,440,855 A | * | 8/1995 | Loucks | 52/518 |
| D367,327 S | | 2/1996 | D'Onofrio, Jr. et al. | |
| D367,988 S | | 3/1996 | Chan et al. | |
| 5,526,626 A | * | 6/1996 | Loucks | 52/518 |
| 5,531,215 A | * | 7/1996 | Schwarz | 126/578 |
| 5,692,491 A | | 12/1997 | Christensen et al. | |
| 5,865,905 A | * | 2/1999 | Clemens | 136/245 |
| 6,109,258 A | | 8/2000 | Rylewski | |
| 7,357,440 B1 | | 4/2008 | Calandruccio | |
| 7,434,577 B2 | * | 10/2008 | Doherty | 126/651 |
| 7,631,641 B1 | * | 12/2009 | Goldman et al. | 126/629 |
| 7,661,422 B2 | | 2/2010 | Liu et al. | |
| 7,677,243 B2 | | 3/2010 | McClendon | |
| 7,694,672 B2 | * | 4/2010 | Christensen | 126/631 |
| D663,261 S | * | 7/2012 | Cheung | D13/102 |
| D663,262 S | * | 7/2012 | Cheung | D13/102 |
| 8,338,694 B2 | * | 12/2012 | Hoffman | 136/246 |
| 8,371,287 B2 | * | 2/2013 | Fleischmann | 126/628 |
| 2003/0168056 A1 | * | 9/2003 | Fidler | 126/628 |
| 2005/0211238 A1 | * | 9/2005 | Archibald | 126/675 |
| 2007/0199562 A1 | * | 8/2007 | Doherty | 126/647 |
| 2009/0139665 A1 | * | 6/2009 | Cha | 160/87 |
| 2010/0154788 A1 | * | 6/2010 | Wells et al. | 126/658 |
| 2011/0109957 A1 | * | 5/2011 | Ylitalo | 359/359 |
| 2011/0188205 A1 | * | 8/2011 | MacManus et al. | 361/703 |
| 2012/0017887 A1 | * | 1/2012 | Ahnert et al. | 126/652 |
| 2012/0085504 A1 | * | 4/2012 | Cha | 160/236 |
| 2012/0222670 A1 | * | 9/2012 | Dolphin et al. | 126/704 |

FOREIGN PATENT DOCUMENTS

| | | | |
|---|---|---|---|
| WO | 83/00378 | 2/1983 | |
| WO | WO 2006131946 A1 * | 12/2006 | F24J 2/26 |
| WO | 2007/030732 A2 | 3/2007 | |
| WO | WO 2009060475 A1 * | 5/2009 | F24J 2/26 |
| WO | 2009/127115 A1 | 10/2009 | |
| WO | 2011/035037 A2 | 3/2011 | |

* cited by examiner

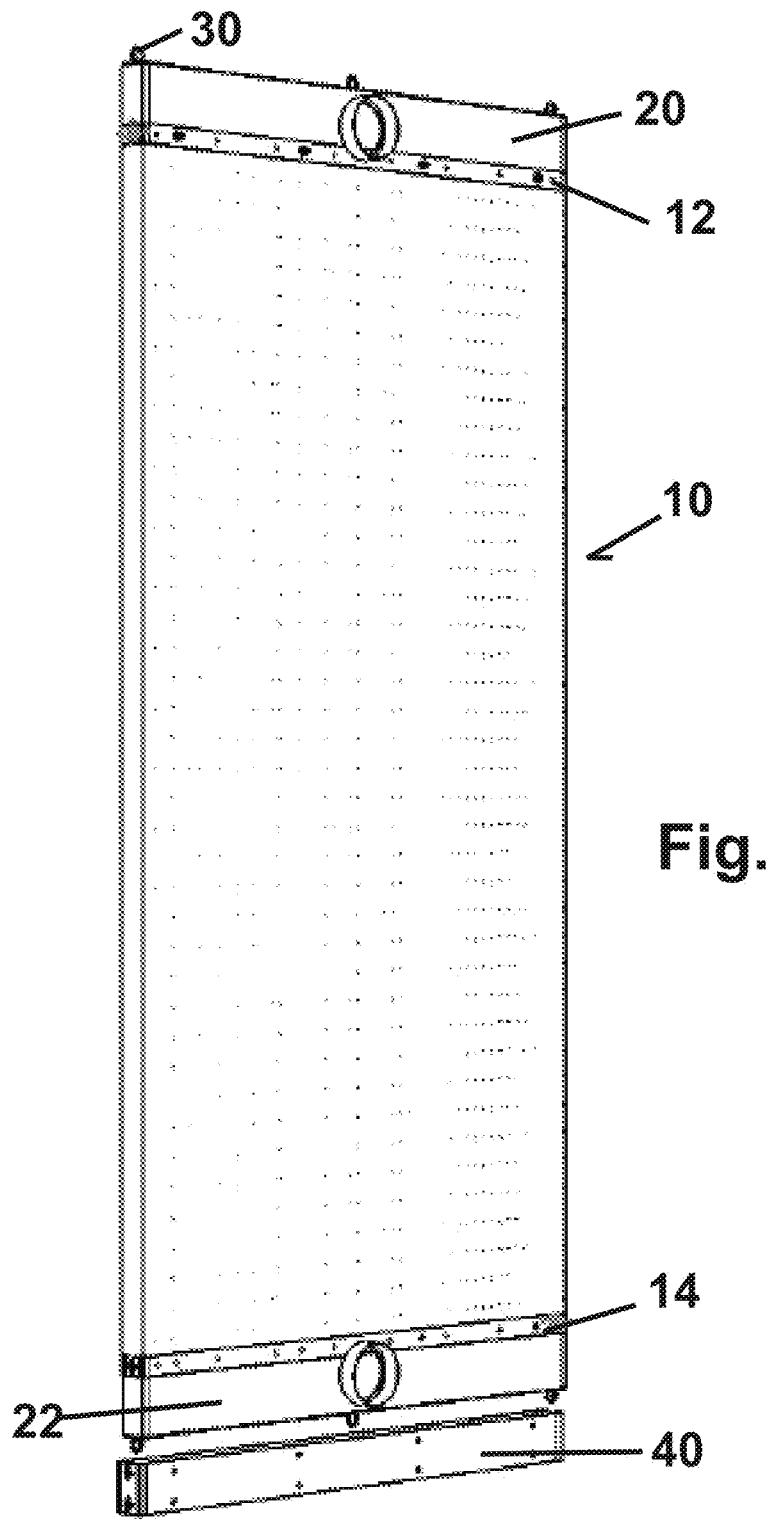

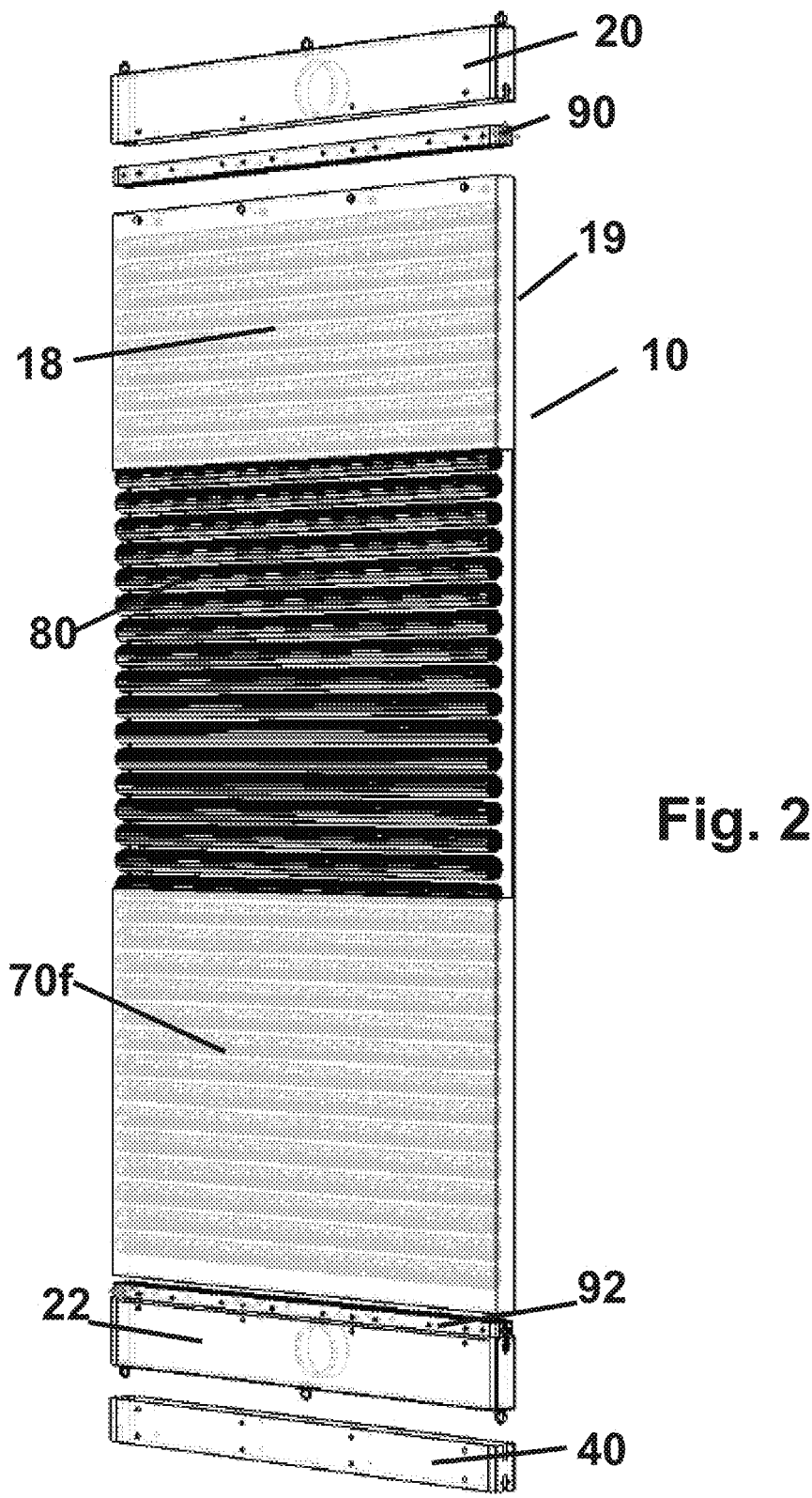

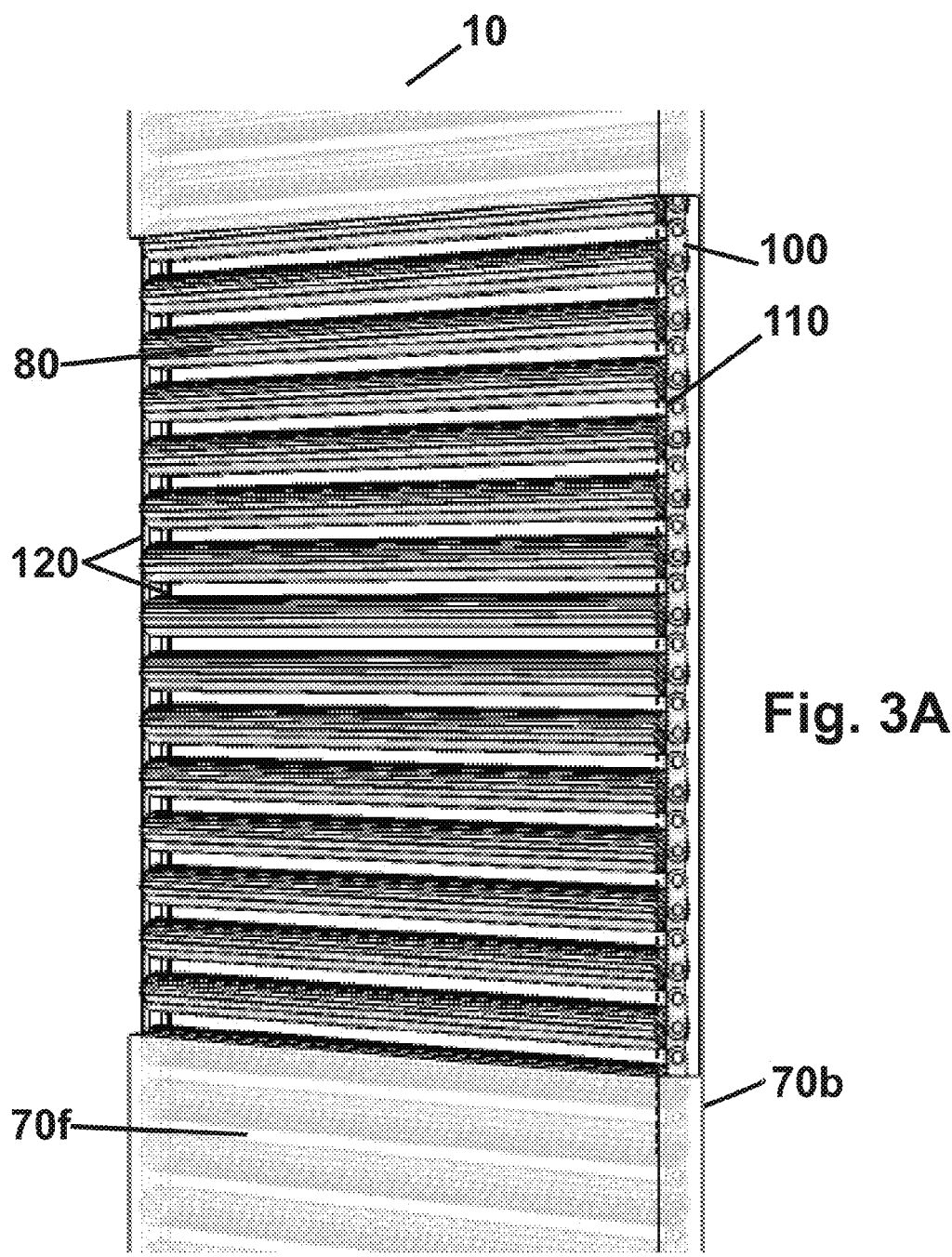

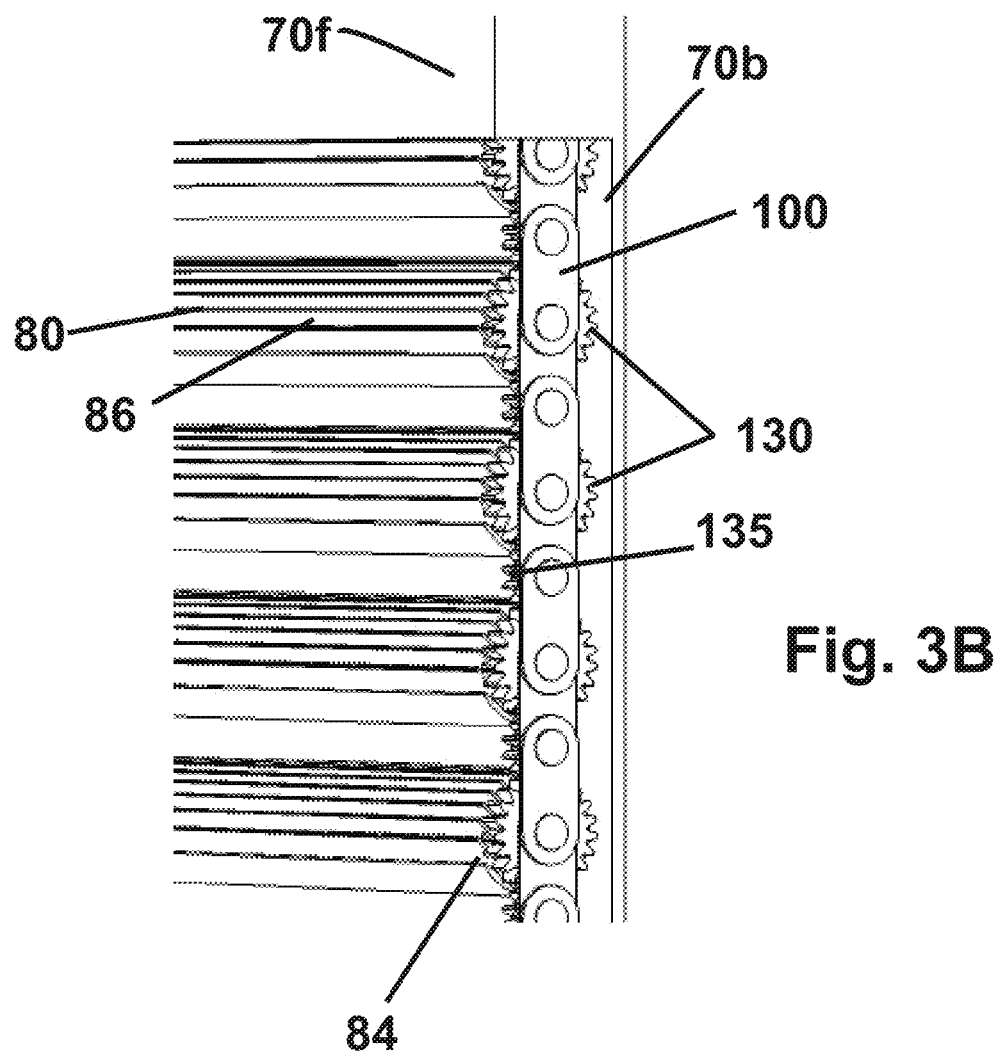

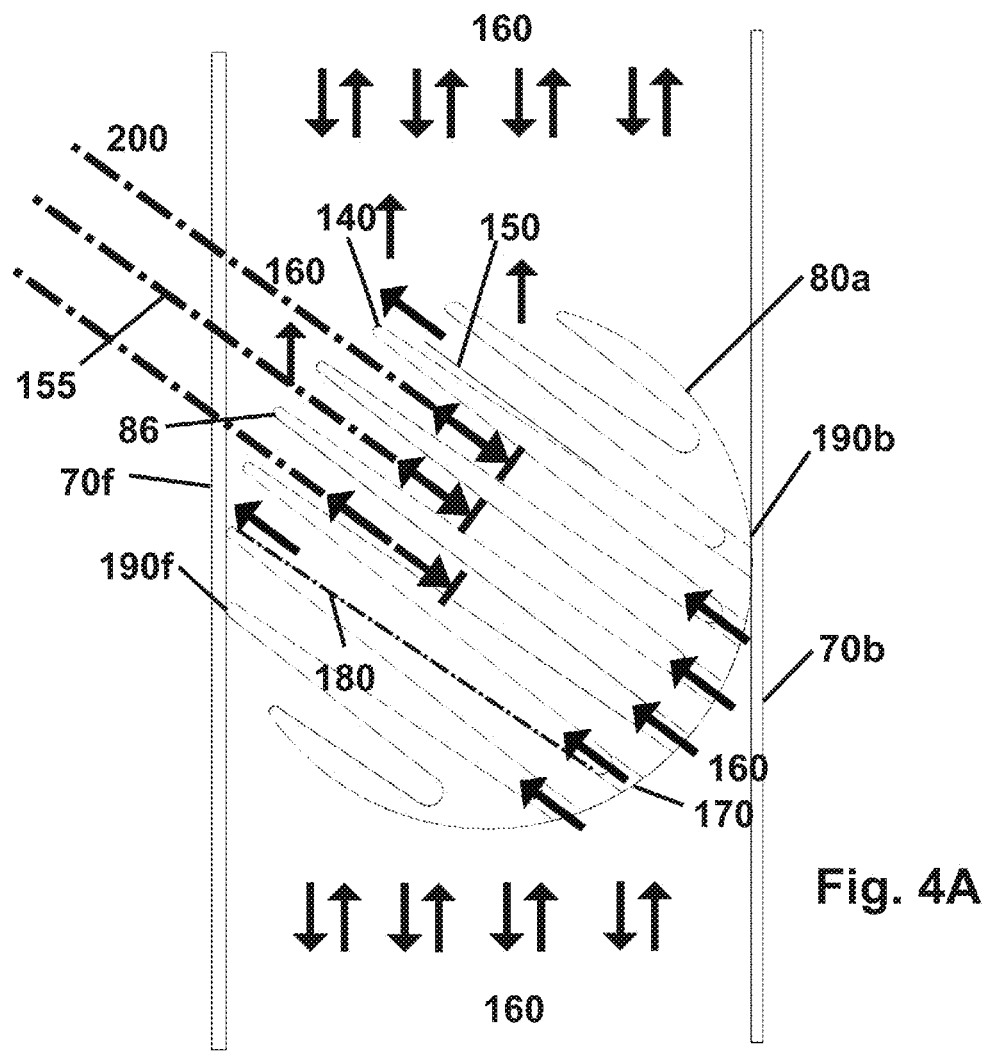

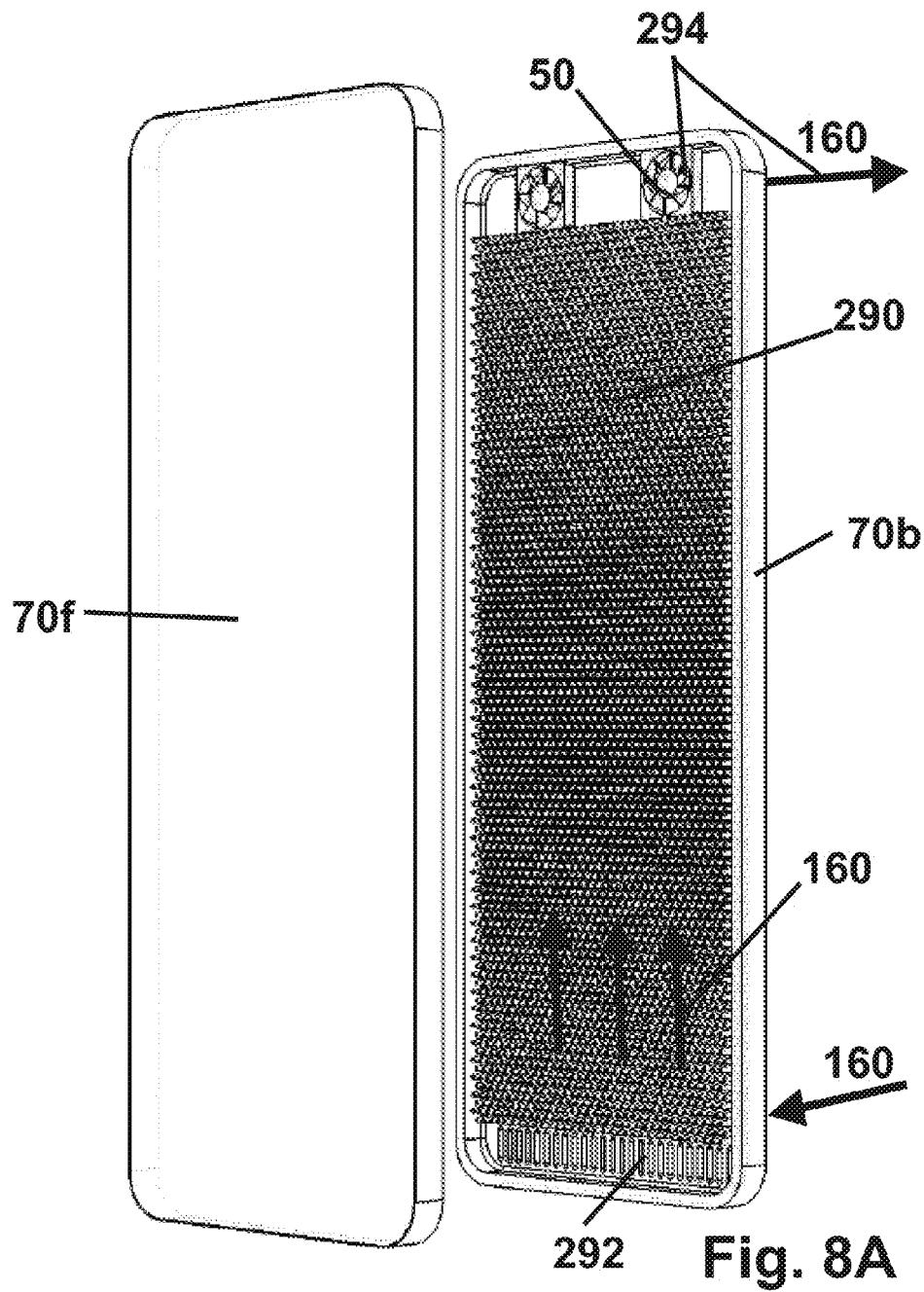

SOLAR AIR HEATING DEVICE

FIELD OF THE INVENTION

This invention relates generally to solar powered heating devices, and more particularly, to modular solar powered heating devices using radiation absorbing collectors.

BACKGROUND OF THE INVENTION

Most commercially proven solar air heating systems are transpired air panels (i.e. air flows through the surface of the panel) installed on exterior building walls, to preheat fresh ventilation air for the building heating system. For example, U.S. Pat. No. 4,774,932 to Hollick describes a flat or vertically corrugated panel covered with perforations, such as holes or slits, and spaced off the south facing building wall. Solar radiation heats up the absorbent face of the panel and the building heating system fans pull in the solar-heated boundary layer air that collects on the outside surface of the panel, through the perforations into the plenum behind the panel, and then into the heating system intake. This is an engineered system for a large panel area and high ventilation air flows.

Ambient wind is a significant factor that reduces the efficiency of this system. If the transpired air flow through the perforations is less than about 2 cubic feet per square foot of panel, the heated boundary layer air collects on the panel surface and may be blown away by wind. This is a limiting factor in scaling the system down to small commercial and residential applications, wherein small panel areas and low solar heated air flows are required. Another efficiency reducing factor arises from the fact that the panel is normally mounted on a vertical building wall. This 90° angle to the ground is not perpendicular to the daily and seasonal sun's path angle (averages about the degree of latitude of the installation). Thus some sun radiation is reflected off the panel and represents a 20% to 25% loss in radiation on the panel, compared to a panel that is perpendicular to the sun angle over the daily sun path.

The Hollick transpired air solar heating system has been implemented as a commercially successful solar air heater, primarily for building ventilation and heating systems. The only common solar heating systems in residential and small commercial markets are solar hot water heaters. Solar hot water heating systems also have several problems. The installation cost is high as professional installation is required, and even in high utility energy cost locations and with incentives, the economic payback for the system, based on energy cost savings, takes several years. This factor also applies to solar air heating systems that have been tried in residential markets.

Current unglazed transpired solar (UTS) air heaters are disclosed in U.S. Pat. No. 4,744,932 to Hollick, U.S. Pat. No. 5,692,491 to Christiansen et al, and U.S. Pat. No. 7,677,243 to McClenden, and use the suction side of a ventilation fan to draw in ambient fresh air through the transpired air panel perforations in the thermal absorbent surface. This also draws in solar-heated boundary layer air collecting on the solar radiation surface of the panel. The fresh air and heated boundary layer air are mixed in the plenum behind the transpired air panel. This is a single pass system and the heating capacity is affected by ambient wind that will blow heated boundary layer air off the UTS panel.

Glazed transpired solar (GTS) heaters, as disclosed in U.S. Pat. No. 4,323,054 to Hummel, U.S. Pat. No. 7,434,577 to Doherty, U.S. Pat. No. 4,159,707 to Mique, U.S. Pat. No. 4,034,736 to Telkes, U.S. Pat. No. 6,109,258 to Rylewski, and U.S. Pat. No. 4,090,494 to Borst et al., operate in a similar method as described above but are more efficient, even with the loss of radiation transmission through the glaze, because the glaze prevents ambient wind from blowing the heated boundary layer air off the transpired panel surface as happens on non-glazed UTS panels. These are also single pass systems.

The porosity of UTS transpired air panels is also a critical factor in the thermal performance of the system. The Department of Mechanical Engineering, University of Auckland, New Zealand study entitled Use of Perforated Metal Sheets as Solar Collectors for Building Space Heating, August 2004 shows that the optimum collector porosity was 0.2% to 0.4% of the total surface area of the panel. Northern hemisphere panels use porosities in the range of 1.0% to 2.0%. It was also recognized that reduced fan suction rates and high wind speeds also affected UTS collector efficiency.

U.S. Pat. No. 7,434,577 to Doherty discloses a series of fixed orientation angle flat solar heated collectors that heat the air flow in stages. Each collector front edge is in contact with a front glaze panel and the back edge is in contact with the back panel. The air flow enters the edge of the collector into a series of partitions inside each collector parallel to the length of the collector and is heated by the thermal conductivity of the collector. There is no direct air flow contact with heated boundary layer air on the surface of each collector other than from convection into the air flow to the next collector inlet. Staged heated air also accumulates under the upper bottom surface of the next angled collector where it is in contact with the back panel and out of the air flow path. While this adds bottom thermal conduction heat to the air flow inside the collector, there is limited mixing of air thermal transmission.

U.S. Pat. No. 4,159,707 to Miguel, U.S. Pat. No. 4,034,736 to Telkes, U.S. Pat. No. 6,109,258 to Rylewski and U.S. Pat. No. 4,090,494 to Borst et al. disclose staged adjustable or fixed collectors. Rylewski discloses transparent collectors with a glaze and back panel in contact with each collector, but no fresh or recirculating airflow. Telkes and Miguel disclose staged collectors but the air flow can move past each stage between the glaze and the collector. Borst discloses a fixed collector plate formed into perforated louvers. Solar radiation only falls on the tilted front perforated surface to draw solar heated boundary layer in to the air flow like Hollick. These solar air heaters are also of a rigid construction.

The successful solar air or water heating product for residential and small commercial markets should be manufacturable in high volume; flexible and modular to suit the variety of applications and installations in these markets; simple and easy to install; easy to ship and store; attractive to suit residential applications; and have a high solar heating efficiency and a short economic return.

SUMMARY OF THE INVENTION

A modular solar heating module and method of heating air or liquid, or both, with solar radiation is provided. The module is simple to install, requires almost no maintenance, and can operate remotely, with or without controls. The module can be configured in different sizes for different applications, and can be mounted in vertical, horizontal, or angled planes, to face in the general direction of the sun's path. The solar heating module can hang in windows to heat rooms or inside of buildings. The modules can be mounted on building walls or roofs to supply solar-heated air or water to the building heating systems. Crop drying, greenhouse heating, and heating processes are industrial applications for configurations of the modules in larger sizes. When not in use, the module can be rolled up or folded for storage.

The solar radiation collector module is a plurality of collectors that have solar radiation absorbing surfaces that collect solar radiation. The collectors may be adjustable (automatically or manually) to follow the sun's seasonal and latitude angle path. Alternatively, a fixed collector embodiment may not need such adjustability.

The collector surfaces in the device are shaped or perforated to collect solar radiation and heat boundary layer air on each collector. Modular air flow ducting components are mounted on the solar collector module to direct the air flow through the collector module by convection or fan means. The arrangement of collectors in the module is in a staged progression for the air flow to be heated. The solar heated boundary layer air at each collector adds to the temperature increase of the previous collector. Re-circulating building or outside ambient air flow through the module absorbs the solar-heated boundary layer air from each collector and the air flow is heated in stages as it passes through the collector module. The air circulation through the module may be adjusted to heat ambient fresh air or re-circulated building air, or a mixture of both, and directs the solar-heated air flow into or out of a building.

A transparent glaze covers the collector module and seals the air flow at the edge of the collectors. The glaze can be transparent on both sides of the module to allow sunlight to pass through the module into the room or building. The glaze can also be preformed with raised surfaces that act as collectors. An installed solar heating device can be increased in size by adding more modules.

An embodiment of the solar air heating module has collectors with piping that carry liquid through the collector module. The solar radiation heats both the air and liquid. The air flow through the device adds additional heat to the liquid.

This invention is a modular solar heating device and method of heating air or liquid, or both, with solar radiation. After installation, the solar heating capacity of the device can be reduced or increased by removing or adding modules. The device is simple to install, and requires minimal maintenance.

The device uses solar radiation to thermally heat air on radiation absorbent surfaces of aligned collectors that face or track the sun within a module. This surface heated air, referred to herein as boundary layer air, increases in depth on the surface as the solar radiation builds up and also reflects back through the air layer. The air flow movement of either outside ambient fresh air, recirculated building air, or a mixture of both, sweeps up the boundary layer air on the collectors and creates a flow temperature rise. The solar heated boundary layer air (heated air on the surface of the collector created by the sun radiation) on the thermal absorbent surface of a transpired air solar collector can be used to heat the solar heater air flow in staged passes through multiple collectors.

A solar air heater is provided, including: a series of aligned solar radiation absorbing collectors; the collectors enclosed in a front transparent film on a first side facing the sun and a back film on a second opposed side; the front and back films in contact with the edge of each aligned collector; wherein an air flow passes through the collectors between the first and second films, the air flow mixing with air on a radiation absorbing surface of the first side of each collector and carrying the mixed heated air to an adjacent collector; and a duct to flow the air flow into a space to be heated.

A gear assembly may be used for rotating the collectors to face the sun. The front and back films may be flexible and have projections to align and retain the solar collectors in position.

The collectors may be a plurality of conical projections formed or moulded in a surface of the back film. Alternatively, each collector may have a series of tapered fins facing the sun, the tapered fins having side wall surface areas and the collector having slots in the tapered fins to allow air to move through the collector and collect heated air.

The collectors may be generally cylindrical. Alternatively, the collector shape may be of a thin material formed into a semicircular shape and the collectors have perforations allowing air to move through the collectors. Yet further alternatively, the collectors may be generally flat and have openings to allow air to move through the collector; and the spacing of the front film from the back film may be adjustable, so that the front film and back film contact the collector.

A surface of the collectors facing the solar radiation may have a series of tapered fins that have tapered sides. The collectors may be attached to and pivot on the back film plane.

The collectors may be cylindrical and have a plurality of tapered fins spaced apart on the longitudinal axis of the collector to allow air to move through each collector between the fins and the front and back films.

The collectors may be arranged in a vertical series and each of the collectors may be mechanically connected to an adjacent connector such that the collectors are adjustable in unison, in orientation of the collector longitudinal axis to the solar radiation.

The collectors may be adjustable by motorized means to align the collectors at an angle to the sun. The collectors may be made from a solar absorbent material or coated with a solar radiation absorbing material, and the collectors may be made of a material sufficiently rigid to maintain a shape and position.

The collectors can be drawn into a compact closed series relationship.

A tube may be mounted to a solar radiation absorbing surface of each collector, each of the tubes connecting to an adjacent tube on an adjacent collector forming a series of tubes, the series of tubes having an exit and an entrance into the solar air heater; the series of tubes carrying a liquid to be heated by thermal conduction from the solar absorbing surface of the collectors and the thermal convection from the air flow.

A solar air heating module is provided including an air entrance situated proximately to a bottom of the module and an air exit situated proximate the top of the module; a back film, having a plurality of conical solar collectors extending perpendicularly therefrom; a front film in contact with the collectors to prevent air from escaping between the entrance and the exit; wherein air, when entering the entrance, passes by the collectors to mix with heated air before reaching the exit.

GENERAL DESCRIPTION OF THE DRAWINGS

FIG. 1A is a perspective view of an embodiment of a module of a solar air heating device according to the invention in a vertical position.

FIG. 2 is a perspective partially exploded view of a module shown in FIG. 1A.

FIG. 3A is a perspective partial view of an embodiment of a module according to the invention and the collectors therein.

FIG. 3B is a perspective partial view of cylindrical collectors according to the invention having gears.

FIG. 4A is a cross sectional view of an embodiment of a collector according to the invention.

FIG. 8A is an exploded perspective embodiment of a module according to the invention wherein collectors are fixed to the back panel.

DETAILED DESCRIPTION OF THE INVENTION

Figure 1B:
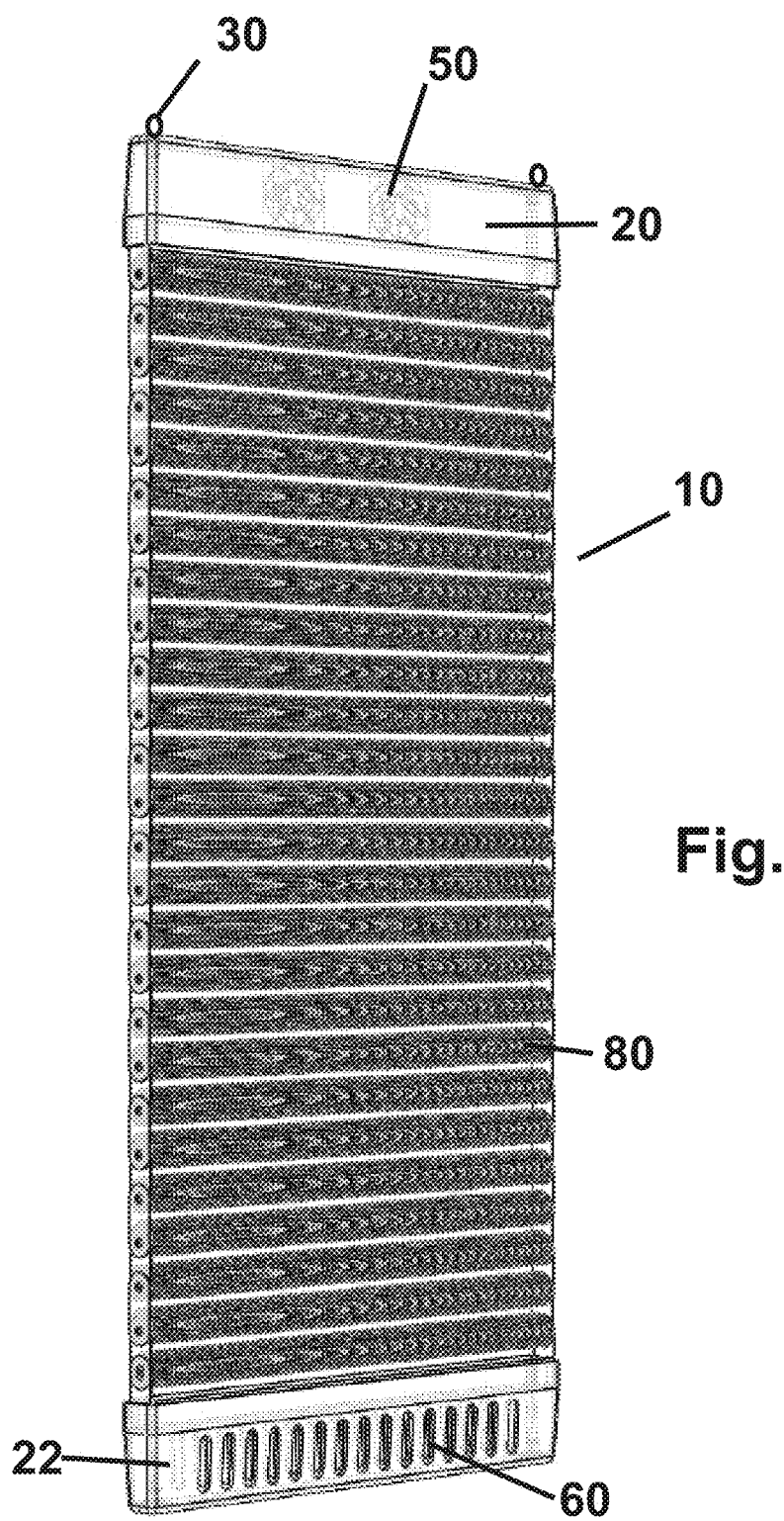
FIG. 1B is a perspective view of an embodiment of a module having built-in fans.

As seen in FIG. 1A solar collector module 10 (which may be part of a larger solar collector device or may act as a solar heating device on its own) may be positioned vertically on a surface, such as an exterior wall. Module 10 can operate in a horizontal or vertical position and at any slope or angle to the sun's path. The width, length, and thickness of module 10 is adjustable to suit installation, air flow, and heating capacity requirements.

The module 10 as shown in FIG. 1A is connected to external ducting and extraction fans (not shown). Duct hoods 20, 22 are mounted, respectively, on top end 12 and bottom end 14 of solar collector module 10, and direct fresh outside air or recirculate building air through module 10 either into, or away from, a duct or other air passage. Module 10 is hung from a wall or ceiling by hooks 30 attached to hood 20, or alternatively, may be mounted directly on a wall or roof with tie-downs. More collector modules 10 can be added by joining modules together with connectors 40 attachable to duct hoods 20, 22. The unheated fresh or recirculated air flow direction is also reversible in this solar air module 10. Module 10 contains a plurality of aligned solar collectors 80.

As seen in FIG. 1B, built-in electrical fans 50 may be incorporated in duct hood 20. Electricity for built-in fans 50 may be provided from a photovoltaic panel or other electrical power source. In the embodiment shown in FIG. 1B, duct hood 22 on the air flow inlet has an air inlet 60, such as an adjustable intake vent with a baffle (not shown) that may be set for interior or exterior air, or a mixture of both.

Rather than being part of air inlet 60, the baffle may be an adjustable two-way baffle within an air duct to control air flow, and heat outside fresh air or inside recirculated air, or a mixture of both, for building heating. In this embodiment of the invention, the module 10 may hang inside a window that is open a few inches at the lower sill to let fresh air into the room. Inlet 60 may be on the solar radiation side and also positioned facing the inside of the room. A baffle in this module 10 has means to open or close the inlet on either side to allow outside air only, inside air only, or a mixture of both. This provides a means to insert fresh air into the room, recirculating air flow, and mixing the two sources for a better room environment.

As shown in FIG. 2, collector module 10 has a transparent glaze 70f on the side 18 facing the sun and panel 70b, which can be either a transparent glaze or opaque panel, on the opposite side 19 of module 10, facing away from the sun. Glaze 70f and panel 70b can be solid or flexible, and cover the solar collectors 80 in module 10 (as seen in the cutaway portion of FIG. 2). In the embodiment shown in FIG. 2, collectors 80 and glaze 70f are secured to retaining brackets 90, 92 that attach to duct hoods 20, 22, respectively.

As seen in FIG. 3A module 10 includes a plurality of collectors 80 organized approximately parallel in a bank. Glaze 70f, a portion of which is shown, covers collectors 80. There are many different embodiments of collectors 80 that can be used in module 10. Each collector 80 has an absorbent coating or material and colour to capture solar radiation as heated boundary layer air 180 on the surface of the collector. In another embodiment of this invention, collector 80 has a reflective surface to concentrate sun radiation onto a surface or tube. Collector 80 can be metal, plastic, or other material, and retains sun radiation through surface absorptivity, material thermal conductivity, and surface indentations or perforations.

Collectors 80 may be made of a variety of materials with low thermal conductivity, or metal, and may have radiation absorbent coatings to collect solar heated boundary layer air. The important features of the material of collector 80 are that it be able to retain a shape and a solar absorbent coating. Examples include metal, plastic, wood, concrete, fabric, composites, and even paper.

The bank of collectors 80 can be fixed in a stationary position or adjustable so that their surface planes are normal to the sun angle. Means of adjusting collectors 80 include a pivoting connector 110 with a chain or the like, or straps 120 to adjust all the collectors 80 in module 10 together and in alignment.

The collectors 80 can track the sun movement by manual or motorized means in either a horizontal or vertical orientation to increase the solar radiation on the collector surfaces and increase seasonal efficiency. The Natural Resources Canada Clean Energy Project Analysis Software as used on a model of this invention shows the following seasonal nine month estimated performance for flat plate collector model located in Vancouver Canada (49.2° North Latitude).

| RETScreen Energy Model Vancouver BC Canada 9 months per year operation 2.8 sq m Collector | | | | | | | |
|---|---|---|---|---|---|---|---|
| | Angle of Collectors degrees | Horizontal Daily Radiation kWh/m2/d | Daily Solar Radiation Tilted kWh/m2/d | Heat Delivered 9 mon MWh | Air flow through heater CFM | Temp Average Rise °C. | Seasonal efficiency % | Efficiency change over 90° position Eff change |
| SIS-F3 2.8 | 90 | 3.34 | 2.57 | 1 | 17.9 | 20.3 | 30.2 | % change |
| 3m2 50m3/hr | 49.2 NLat | 3.34 | 3.65 | 1.2 | 17.9 | 22.4 | 36.3 | 20.2% |
| Motorized tracking | 1-dir vert | 3.34 | 4.81 | 1.3 | 17.9 | 20.6 | 37.4 | 23.8% |
| | 2-dir vert/hor | 3.34 | 4.97 | 1.4 | 17.9 | 23.7 | 41.5 | 37.4% |

Seasonal efficiency of the solar air heater increases if the collectors are angled to the angle of latitude normal to the sun. Motorized tracking collectors can follow the daily sun path and can also increase the seasonal efficiency over 30% compared to a vertically fixed solar air heater.

Collectors 80 are each connected to adjacent collectors 80 and are secured in position at side rails 85 with hinged plates 100, 110 on a first side, and, via a flexible strap 120, or other pivoting means on a second side.

Plates, 100, 110, strap 120, and flexible glaze 70*f*, and back panel 70*b*, allow module 10 to roll up or be folded up so that the collectors are drawn into a compact closed series relationship. Thus module 10 is portable, and may be stored easily when not in use and hung up when heating is required. Also, module 10 may be aligned horizontally while collectors 80 are aligned vertically providing a horizontal air flow that can be rolled sideways in a window or southern facing building wall.

As seen in FIG. 3B collector 80 may be cylindrical and have a gear 130 at end 84 of collector 80. Idler gear 135 and gears 130, with a cable, chain, or other means, can be used to adjust the angle of the faces 86 of the collectors 80 to be approximately perpendicular to the angle of the sun above the horizon. The angle adjustment can be done manually or via motorized means and can use a sensor to follow the sun's path. In other embodiments of this invention, the collectors 80 in module 10 are vertically placed and follow the sun's daily azimuth path from east to west.

Gears 130 connected to each collector 80 can be set to a different orientation than that of an adjacent collector 80. This provides a module 10 that has different heating characteristics for different sun angles or daily sun position.

As shown in FIG. 4A, collector 80*a* may have tapered fins 140 that face the sun at an angle 200. Fins 140 have tapered walls 150 that provide more wall 150 surface of fin 140 to the sun's rays 155. This projected surface area of collector 80*a* is much larger than the width times length area of collector 80*a*. This projected surface area captures solar radiation as a heated boundary layer air 180 between fins 140, and on the walls 150 of the fins 140. Slots 170 allow fresh or recirculated air flow 160 from duct hoods 20 or 22 and through collector 80*a*. As the air flow 160 passes through the collector 80*a*, it picks up the heated boundary layer air 180 on the walls 150. The boundary layer air 180 mixes with the air flow 160 and the air flow 160 increases in temperature.

The tapered fins 140 of collector 80*a* increase the projected width of collector 80*a* normal to the solar radiation. The generally circular cross section shape also seals against the front glaze 70*f* and back panel 70*b*, to keep the air flow 160 within module 10, regardless of the angle of the collector 80*a* normal to the sun angle. In a 4 inch diameter×48 inch long collector 80*a*, the normal plane area of 1.33 square feet with 23% open air flow area, has a projected area of 11.53 square feet of solar radiation heated boundary layer air 180.

Glaze 70*f* prevents ambient wind from blowing the heated boundary layer air 180 off collector 80*a*. The front glaze 70*f* and back panel or glaze 70*b* are in contact with each collector 80*a* to direct the air flow 160 to be heated through each collector 80*a* in sequence as the air flow moves through the collectors 80*a* from an air inlet to an air outlet. The moving air flow 160 collects and mixes with the heated boundary layer air 180 on each collector 80*a*. If module 10 is mounted on a building wall, the air flow 160 will also pick up the building heat loss through the wall behind module 10. This heat loss may be significant in non-insulated buildings.

In this embodiment of this invention, the front glaze 70*f* and the back panel or back glaze 70*b* seal against the edges 190*f* and 190*b*, respectively, of each collector 80*a* to direct the air flow 160 through each collector 80*a*. In the case of transparent glazes on the front glaze 70*f* and back panel 70*b* of module 10, this allows solar radiation to heat the boundary layer air 180 on the collectors 80*a* and also pass light into the room or enclosure behind module 10. With an opaque or dark coloured radiation absorbing surface back panel 70*b*, the heated boundary layer air 180 adds to the mix with the air flow 160 in each module 10.

In the embodiment of this invention wherein the horizontally or vertically arranged collectors 80 are cylindrical, the outer circumference of the collector has fins 140 or another surface that is in contact with front glaze 70*f* and another portion 190*b* of collector 80 that is in contact with back panel 70*b*. As the cylindrical collector 80 is rotated to the most efficient position normal to the sun angle the seal s maintained.

In an embodiment with flat collectors 80, after the rotated angle to the sun is set, the distance between the front glaze 70*f* and back panel 70*b* is adjusted by narrowing or widening the distance between the glaze/panel edges 70*f*, 70*b* of module 10, to seal the collector edges 190*f*, 190*b* and air flow 160.

In another embodiment of this configuration, the collectors 80 are attached to the back film 70*b* and a chain or other means may be connected to each collector 80 to adjust the normal angle to the sun.

The air flow 160 direction may also be reversible. However, typically air flow 160 is directed in the same direction as the heat convection flow.

Figure 4B:
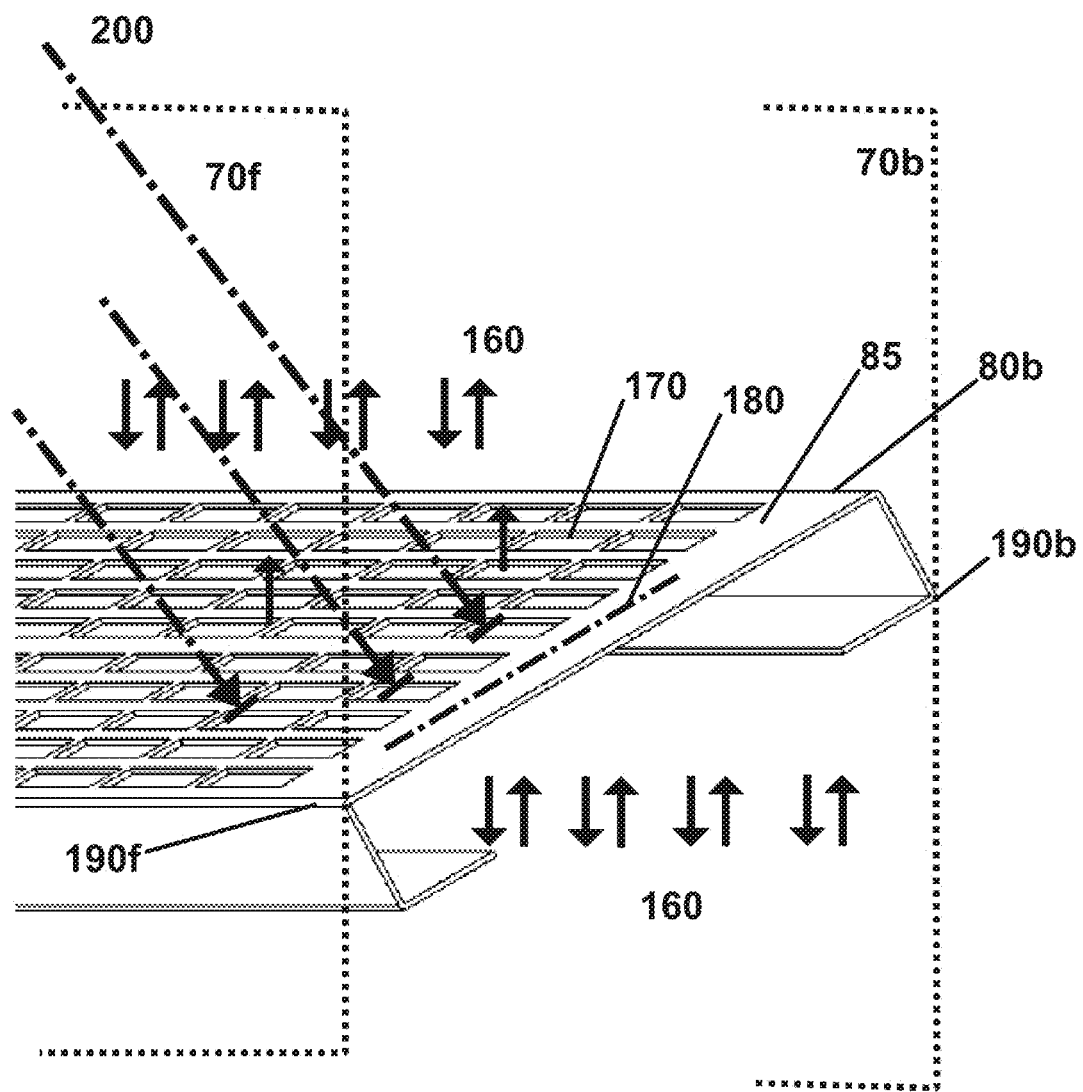
FIG. 4B is a partial perspective view of another embodiment of a collector according to the invention.

As seen in FIG. 4B, collector 80*b* may be substantially two dimensional. In this configuration, the face 85 of collector 80*b* is at an angle 200 to the sun and the air flow 160 passes through slots 170 (or perforations) in collector 80*b* to pick up the heated boundary layer air 180 on collector surface 85

Figure 4C:
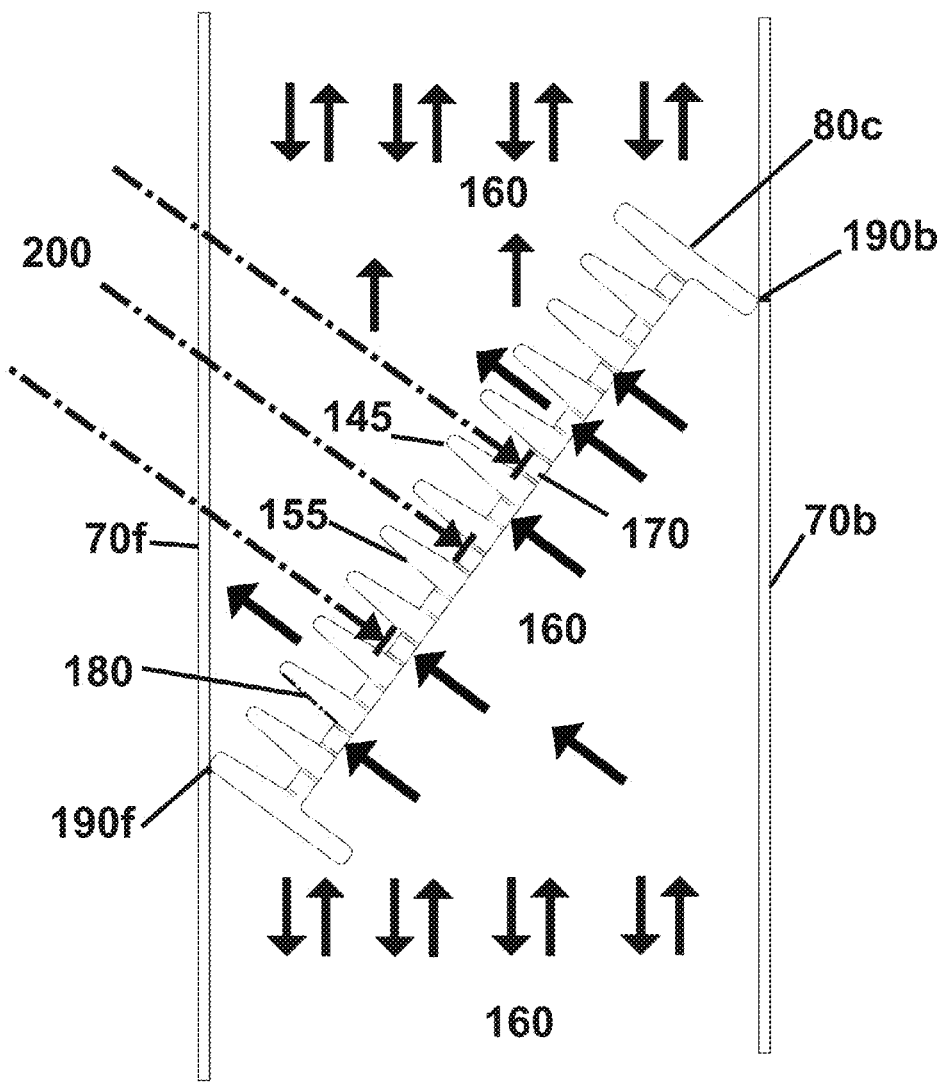
FIG. 4C is a cross sectional view of another embodiment of a collector according to the invention, wherein the collector has tapered fins.

As seen in FIG. 4C collector 80*c* may be extruded or moulded in a flat shape having tapered fins 145 with sides 155 to project a greater surface area to the sun radiation. Air flow 160 flows vertically through collector perforations 170 and mixes with heated boundary layer air 180. After the collectors 80*c* are adjusted to an angle 200 to the sun, glaze 70*f* and back panel or glaze 70*b* are adjusted by manual or automatic means so the glazes 70f, 70b meet and seal each collector 80c at 190f and 190b, respectively, to direct the air flow 160 through each collector 80c in stages, and thereby eliminate bypass.

Figure 4D:
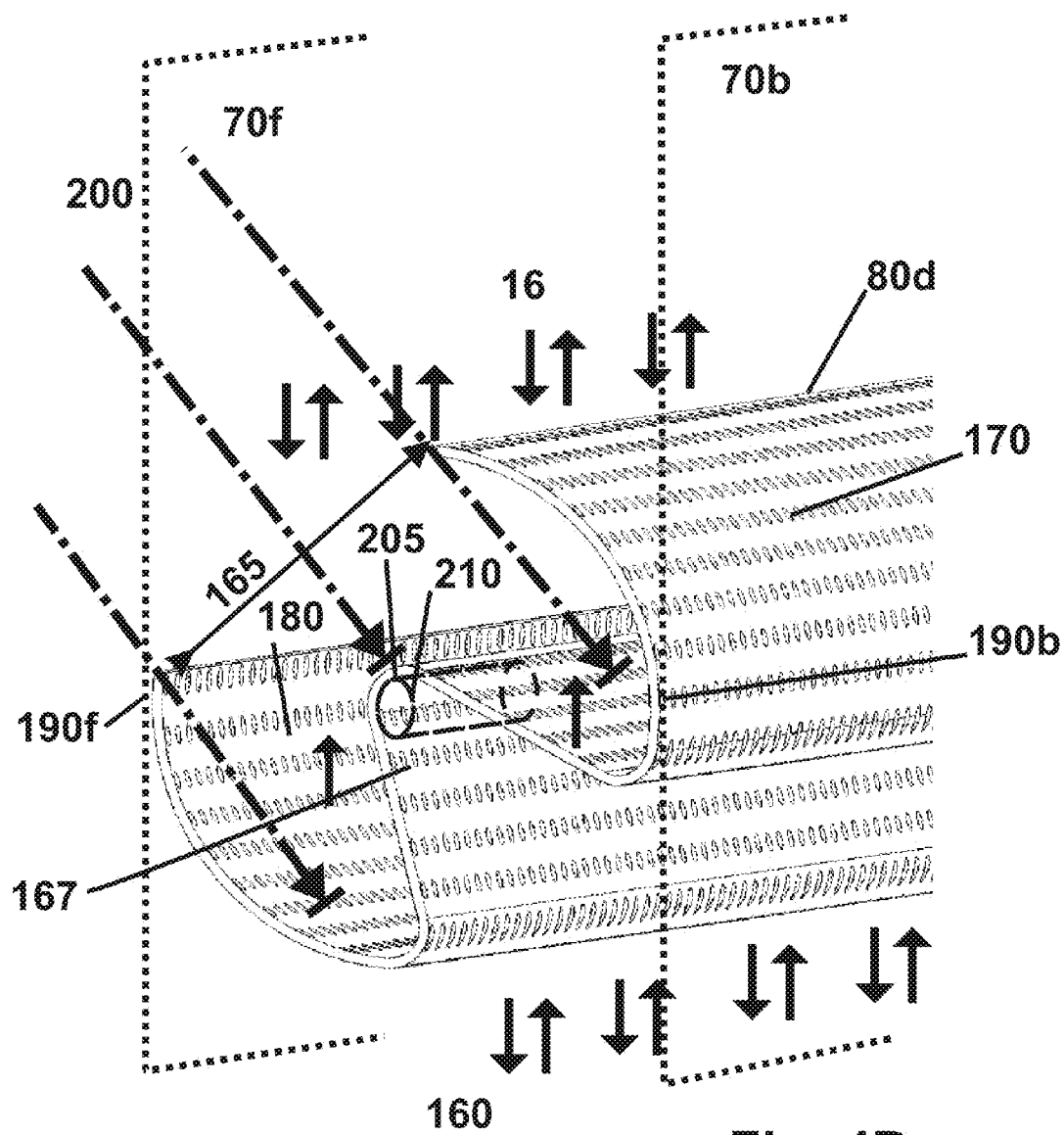
FIG. 4D is a partial perspective view of another embodiment of a collector according to the invention wherein the collector has a semicircular shape.

As shown in FIG. 4D, collector 80d may be formed into a semicircular shape having an open section 165 containing a parabola 167 oriented towards the sun. Perforations 170 allow the air flow 160 to flow through collector 80d and mix with the heated boundary layer air 180. The hollow form of collector 80d reflects the sun radiation into side walls 185. This collector 80d shape may be fixed at an angle in the collector bank, or follow the sun angle via manual or motorized means.

The formed centre portion 205 of collector 80 can also hold a tube line 260 that runs through collectors 80d to heat a liquid such as water. In this embodiment, the solar air heating device 10 can heat water and air at the same time. Each collector 80d adds more thermal conductive heat to the liquid in tube 260 from the convection or fan moved heated air flow 160.

Figure 4E:
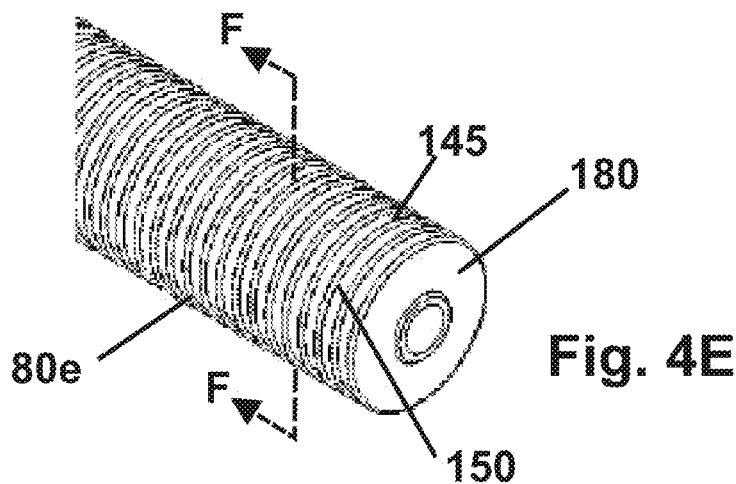
FIG. 4E is a partial perspective view of another embodiment of a collector according to the invention wherein the collector has a cylindrical shape with tapered fins.
Figure 4F:
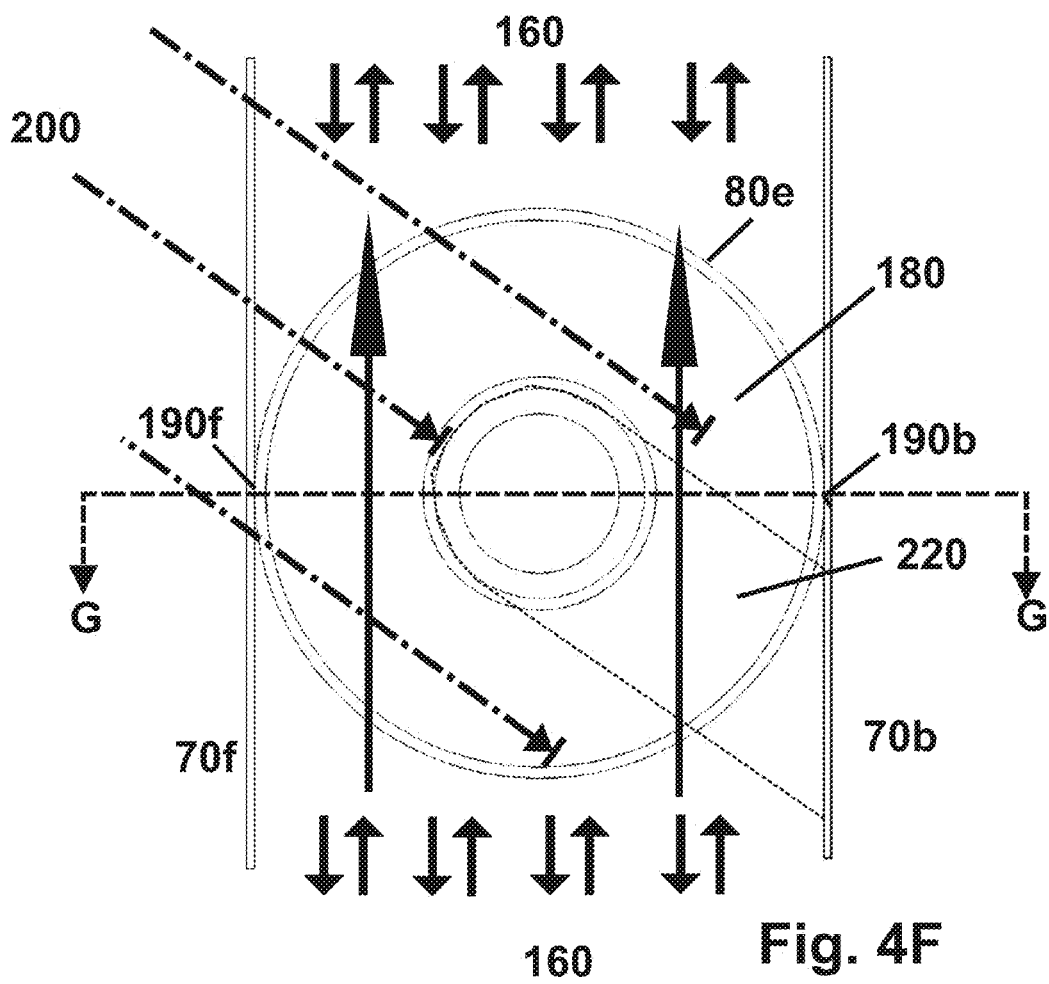
FIG. 4F is a cutaway view thereof taken along the lines F-F.
Figure 4G:
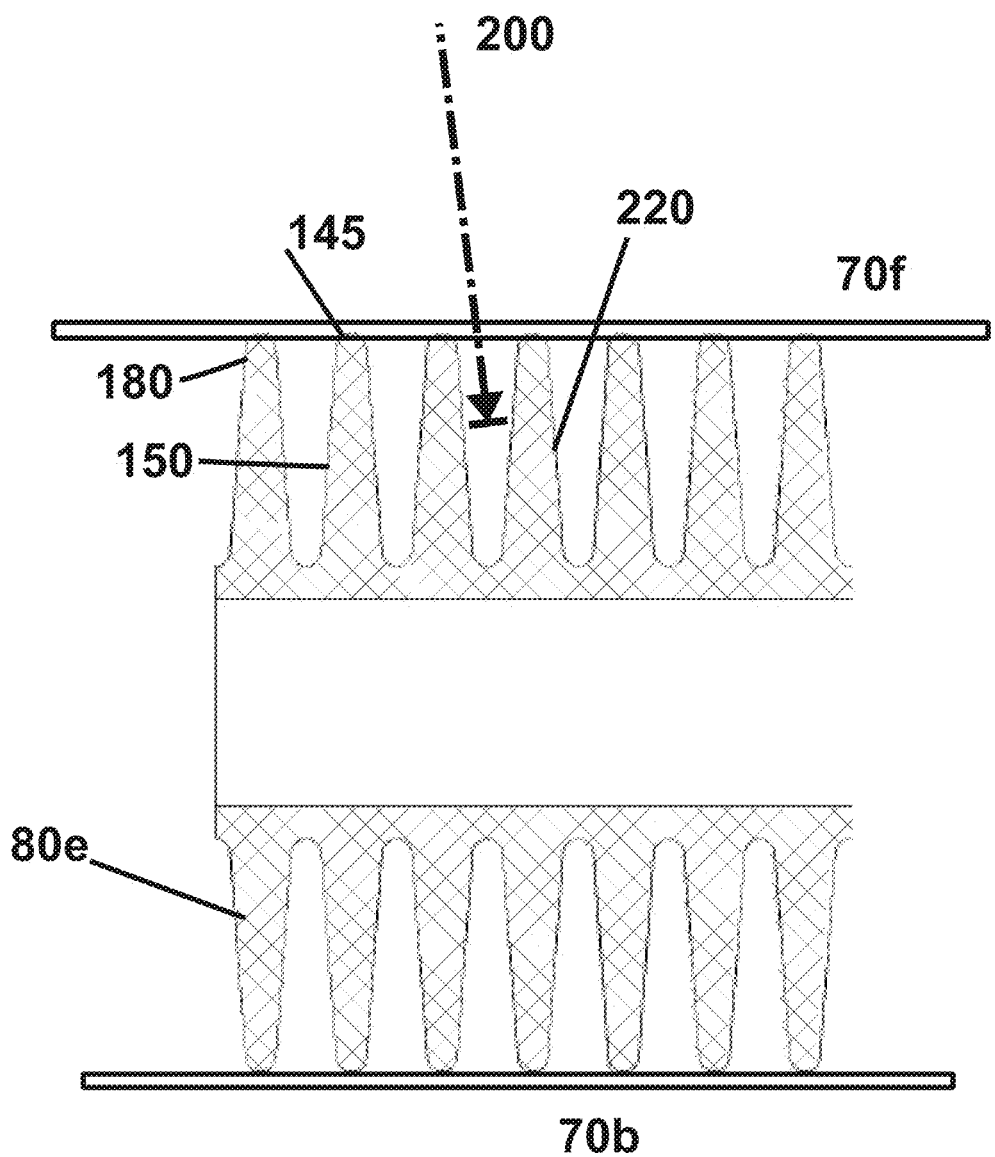
FIG. 4G is a partial cutaway view thereof taken along the lines G-G.

As seen in FIGS. 4E, 4F, and 4G, another embodiment of a collector 80e for use in module 10 is a three dimensional cylindrical solar collector with a series of circular tapered fins 145 projecting from the circumferential surface of collector 80e, resulting in a surface area 150 that is larger than the length by diameter surface of collector 80e. An advantage of collector 80e is that, when stationary, it projects the same surface area to the sun regardless of the daily sun angle from sunrise to sunset. The fresh or recirculated air flow 160 through collector 80e fins 145 picks up heated trapped boundary air 180 between the fins 145. The area of collector 80e opposite the sun 220 on the collector varies depending on the sun angle 200.

The shape and surface texture of collector 80e increases the projected surface area of the collector 80e normal to the sun and increases the heated boundary layer air 180 volume for mixing with the solar heater air flow 160.

The fins 140, 145 of collectors 80a and 80e, spaced along and perpendicular to the axis of the collector, provide that at any sun angle above the horizon, the normal plane of the stationary circular collector 80a, 80e facing the sun is the same tapered fin area less the shadow projection of the collector core. Air flow 160 through the collector fins 140, 145 is mixed with solar heated boundary layer air 180 on the fins 140, 145.

A series of stationary horizontal collectors 80, such as collectors 8oa and 80e, can be used to track the annual seasonal sun angle above the horizon. A series of stationary vertically positioned, cylindrical collectors 80 can track the daily sun movement from east to west. Therefore, a manual or motorized means to change the collector angle normal to the sun radiation is not required for efficiency.

Figure 4H:
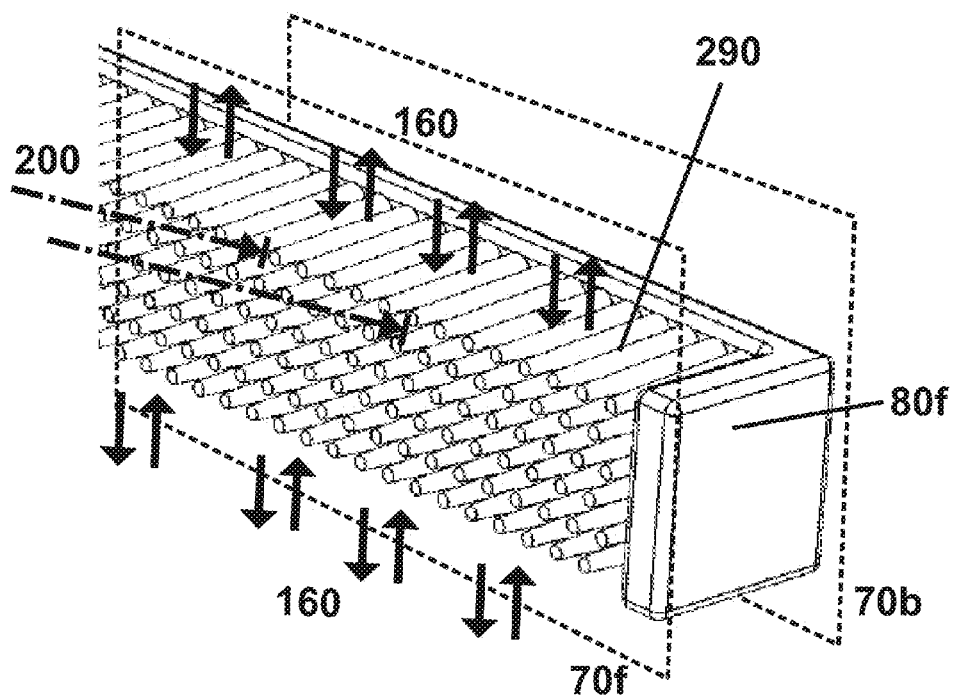
FIG. 4H is a partial perspective view of an alternative embodiment of a collector having a plurality of conical members.

FIG. 4H shows an embodiment of collector 80f wherein the surface of collector 80f includes a plurality of cones 290 in contact with the front film 70f and back panel 70b. Cones 290 are made of a solar radiation absorbing material and/or have a solar absorbing coating. The air flow 160 passes through cones 290 and absorbs solar heat. from the sun.

Figure 5:
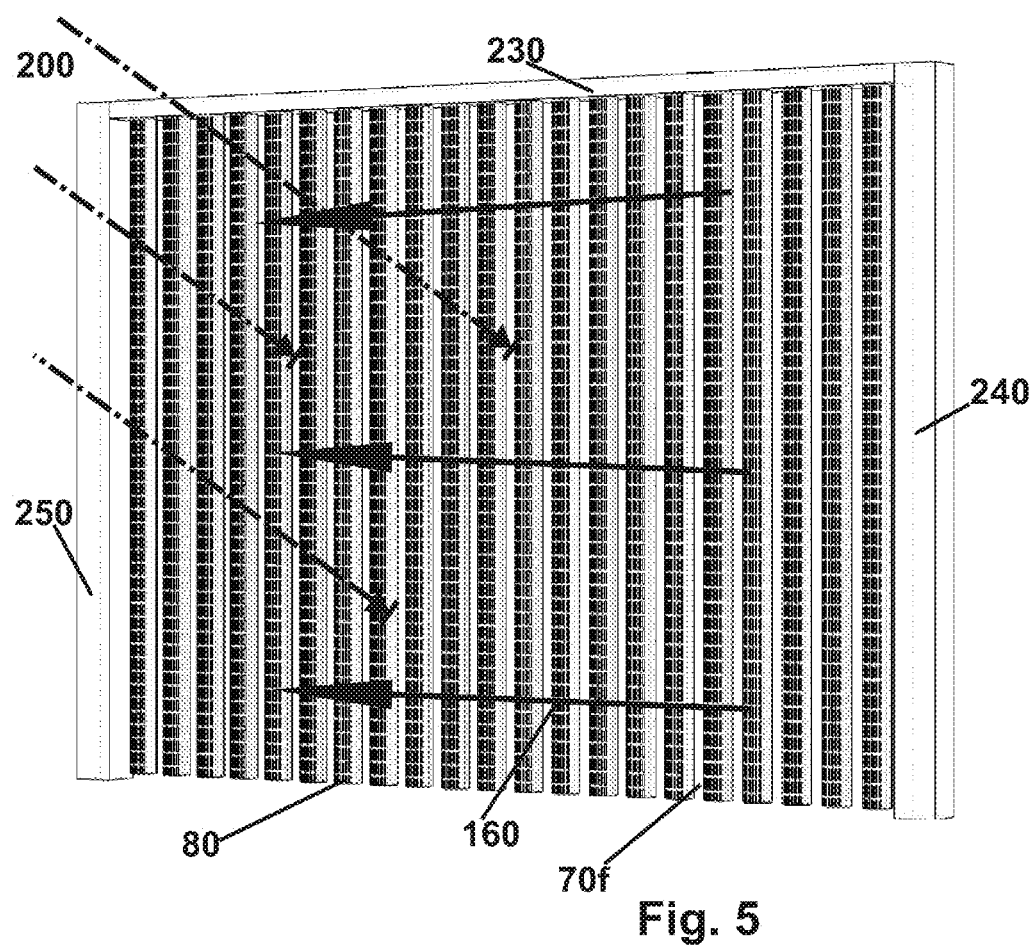
FIG. 5 is a front perspective view of an embodiment of a solar air heating module according to the invention, in a horizontal position.

A horizontally placed module 10 is shown in FIG. 5. In this embodiment, collectors 80 are hung vertically from track 230 within glaze 70f. Inlet duct 240 directs air flow 160 horizontally through the collectors to outlet duct 250.

Collectors 80 can be motorized to follow the daily sun path from east to west or can be stationary collectors, such as collectors 80e, and are placed in module 10 to collect solar radiation. Alternatively, collectors 80 can open and close like a window curtain by drawing the collectors 80 in a direction along upper track 230 into a rolled container (not shown) at one end of module 10 when not in use.

Figure 6:
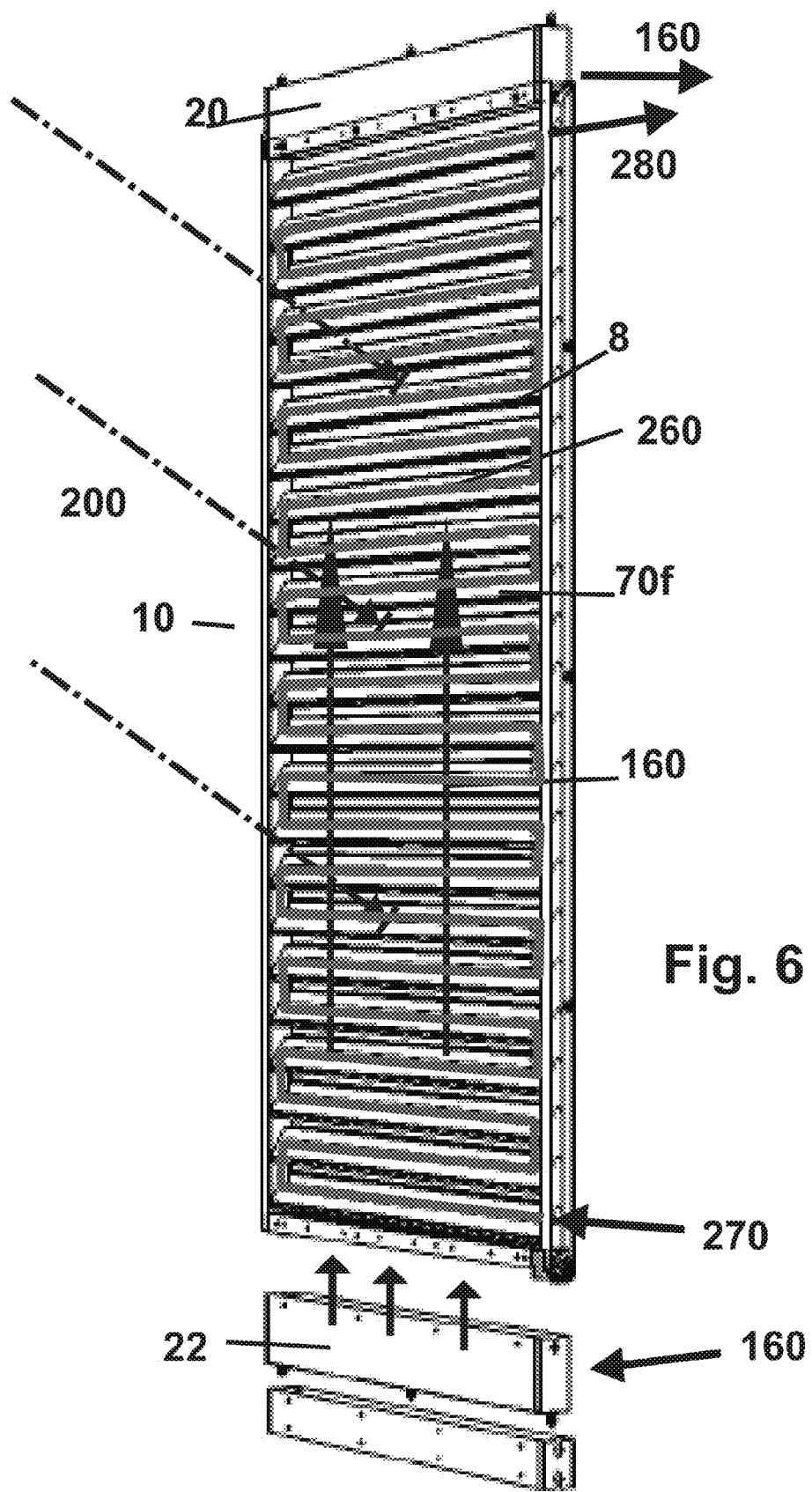
FIG. 6 is another embodiment of a solar air heating module according to the invention, wherein tubes are attached to each connector.

An embodiment of the invention that can be used to heat water or other liquids is shown in FIG. 6. Tube 260 is attached to each flat collector 80 and connected to tube 260 on the adjacent collector 80 by fixed or swivel means. Collector 80 is mounted behind the front glaze 70f on the tube 260 to pivot and adjust to the sun angle by manual or motorized means. If the liquid entering through inlet 270 and air flow 160 flow in the same direction within module 10, then the heated air flow 160 adds heat to the liquid in tubes 260 until the liquid reaches outlet 280, which may direct the water flow to an insulated storage tank (not shown). Thus the module 10 can heat water and store the liquid in an insulated tank during the day. At night a pump on the storage tank can pump hot water through module 10 and the building recirculating air flow in module 10 can pick up heat from tubes 260 and provide building heat at night.

Tube 260 can have a solid, rotatable, or flexible connection between the tube 260 adjacent to collector 80 and the tube 260 on the neighbouring collector 80. The collector 80 at each stage can use tube 260 as an axis to rotate the face of collector 80 to an angle normal to the sun. Tube 260 can also be a solid connected line that moves in the module 10 when the collectors 80 are rotated.

Collectors 80 transfer solar heated boundary layer air 180 heat on the collector 80 surfaces to the metal tube 260 by thermal conduction. The heated air flow 160 from the previous collectors 80 also transfer additional thermal convection and conduction heat to tube 260 and the liquid flowing in the tube 260. The heated air flow 160 and the liquid flow in the tube 260 generally move in the same direction to gain temperature.

In summer, the heated air may be ducted outside the building. In another embodiment, the heated liquid from a storage tank is recirculated back through the module 10 to transfer heat back to the collectors 80 to provide night or overcast day recirculated air heating for a room or building.

As shown in FIG. 4D a perforated circular metal collector 80d may be clipped on tube 260. A chain or other means can adjust the collector 80d angle to the sun by rotating the collector 80d on the tube.

Figure 7:
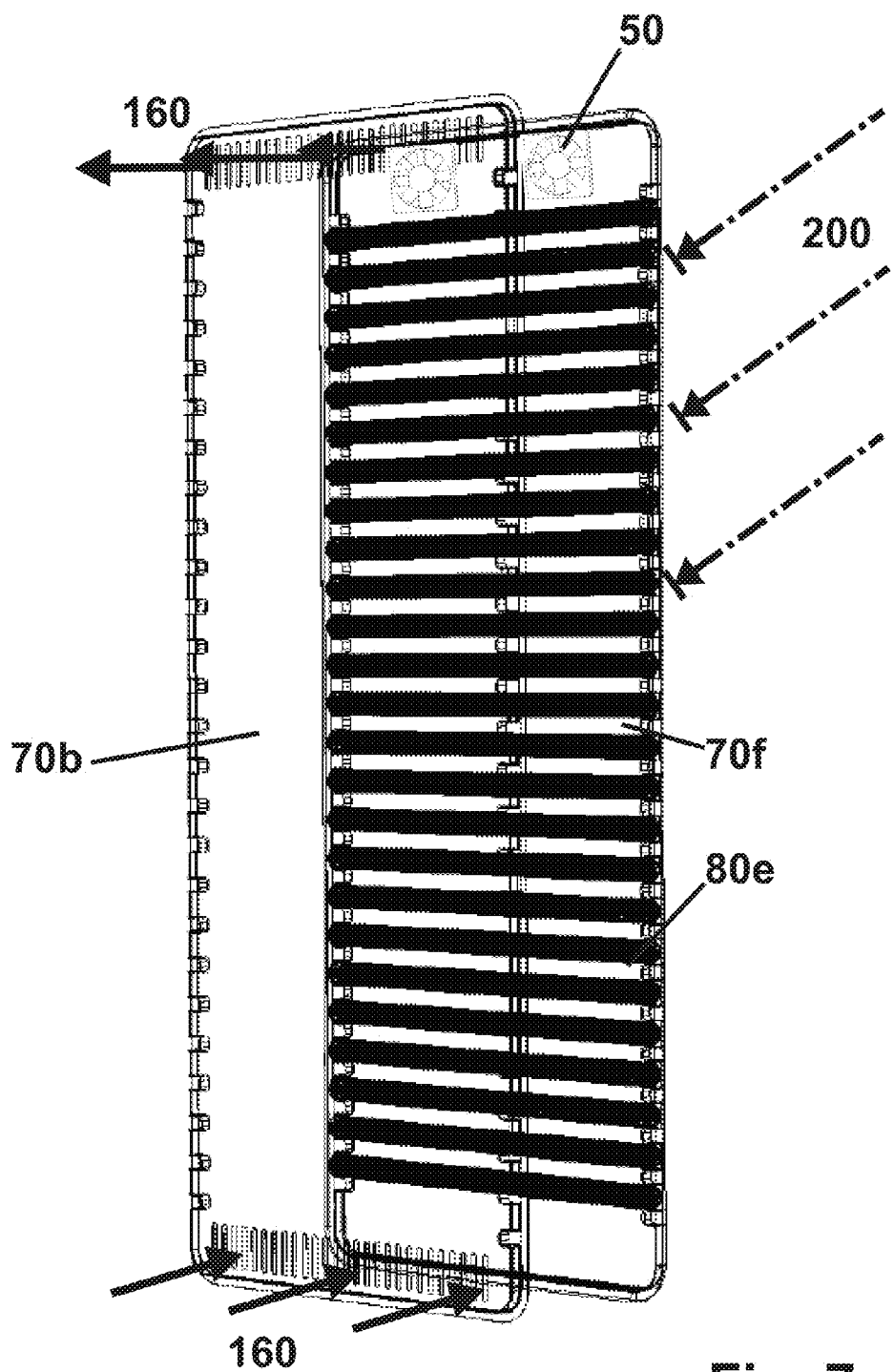
FIG. 7 is a perspective view of a partially disassembled embodiment of the invention wherein a film supports the solar collectors.

As shown in FIG. 7, films 70f, 70b, in contact on opposite sides of each collector 80e, may be rigid and formed or moulded to support the solar collectors 80 in stages. Films 70b and/or 70f may be shaped to hold and position each collector 80e. In another embodiment collectors 80 can be moulded or formed directly in films 70f or 70b. The solar radiation passes through front film 70f, and heats the boundary layer air 180 on each collector 80e. The air flow 160 enters the inlet in film 70b or 70f and projects solar heated air 160 to the outlet in film 70f or 70b. The front and back formed films 70f, 70b are sealed together around the edges of collector 80e. A fan 50 can be added to the outlet to increase air flow.

Figure 8B:
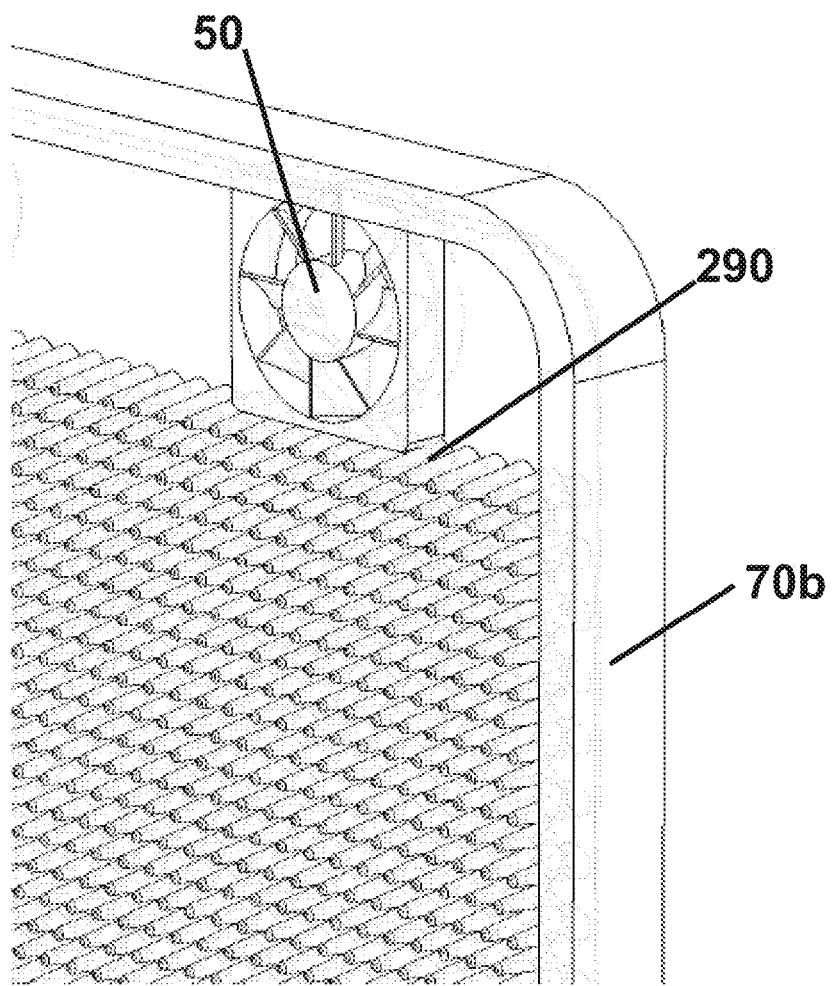
FIG. 8B is a partial view thereof showing the collectors in detail.

FIGS. 8A and 8B show an embodiment of the module 10 wherein back film 70b includes a moulded or formed plurality of cones 290 (similar to those discussed above in reference to FIG. 4H), made of solar radiation absorbing material and/or having a solar absorbing coating, projecting from the film 70b surface. Air flow 160 entering from entrance 292, absorbs the solar radiation as boundary layer air 180 on the cones 290, until reaching exit 294.

The collectors shown in FIGS. 8B (and 4H) may be conical, frustoconical, pyramid shaped or another tapering shape having a base with an area larger than the endpoint.

Modules 10 are modular and can be used with air ducts, fan ducts, and as solar collector banks in different sizes for different applications. It is thus possible to increase or decrease the solar heating surface of an installation at low cost. In a typical embodiment, the components of module 10 provide flexibility in adapting the solar air heater to an installation requirement. The width of module 10 can be sized to suit windows, doors, and other openings or wall mountings. The length of module 10 can be shortened or lengthened by removing or adding collectors 80. Connectors 40 can join modules 10 together to increase surface area and heating capacity. Collector assemblies and collector shapes can be changed to increase or decrease heating capacity or spaced to allow more light through the solar air heater.

Duct hood mountings 20, 22 can be used to make solar collector bank connections to plenums and large multi-duct HVAC systems. Duct hoods 20, 22 may have integral fans 50 to produce the air flow 160 through the solar air heater collector module 10. A fan duct hood 20 can be mounted on the solar collector module inlet/outlet openings 292, 294 to change the direction of the air flow 160.

An advantage of module 10 according to the invention is that the transpired solar air panel absorbing solar radiation is a series of horizontally or vertically placed absorption collectors 80 wherein fresh or recirculated air 160 is pulled through the collectors 80 to mix with the surface solar heated boundary layer air 180. This is the opposite air flow direction of current UTS and GTS solar air heaters.

The depth of heated boundary layer air 180 increases because it is stationary on the collector 80 surface. There is better mixing of heated boundary layer air 180 and air flow 160 because perforations do not restrict air flow volume. As the air flow 160 moves through the series of collectors 80, more heat is added by solar boundary layer air 180 at each collector 80. A experiment of the invention using a four foot× eight foot solar air heater with twentythree flat horizontal collectors 80b, angled at 49° normal to the sun, in a vertical assembly glaze envelope, each three and threequarter inch× fortyeight inch collector had 24% free area openings in the total 28.75 square foot collector area. The experiment occurred on Jan. 19, 2011, in the Vancouver area, Canada, Latitude 49.2° N. At 1:30 pm monitors showed ambient and solar heater intake temperature was 17.5° C. (63.5° F.) and solar air heater outlet temperature was 24.9° C. (76.8° F.). The weather was partially overcast with sunny periods and partially sunny at the time of the monitor reading. The measured outlet air flow from five inch diameter inlet and outlet ducts was fourteen cubic feet per minute. This was a convection air flow rate as no circulation fan was present.

This experiment indicated that flat or shaped absorbing collectors 80 in modules, as described in the embodiments of the invention, provide several advantages. The large free area provides for lower air resistance and convection air flow 160 through module 10, which increases with increased solar radiation heating. This invention can operate without an electric fan by using convection. With a fan 50, increasing solar temperature increases the total convection and fan 50 air flow 160 rate. The total air flow 160 rate drops when the solar temperature drops.

The above-described embodiments have been provided as examples, for clarity in understanding the invention. A person of skill in the art will recognize that alterations, modifications and variations may be effected to the embodiments described above while remaining within the scope of the invention as defined by the claims appended hereto.

The invention claimed is:

1. A solar air heater comprising:
a series of aligned solar radiation absorbing collectors;
the collectors enclosed by a front transparent film on a first side facing the sun and a back film on a second opposed side;
the front and back films each in contact with a front and back edge of each aligned collector, the collectors being rotatable and/or retractable within the enclosure defined by the front film and the back film;
wherein an air flow entering through an air inlet passes through the collectors between the front and back films, the air flow mixing with air on a radiation absorbing surface of the first side of each collector and carrying the mixed heated air to an adjacent collector; and
an air outlet to flow the air flow into a space to be heated.

2. The solar air heater of claim 1 further comprising a gear assembly for rotating the collectors to face the sun.

3. The solar air heater of claim 1 wherein the front and back films are flexible.

4. The solar air heater of claim 1 wherein the front and back films have projections to align and retain the solar collectors in position.

5. The solar air heater of claim 4 wherein each collector is generally cylindrical.

6. The solar air heater of claim 1 wherein each collector has a series of tapered fins facing the sun, the tapered fins having side wall surface areas and the tapered fins having slots allowing air to move through the collector and collect heated air.

7. The solar heater of claim 1 wherein each collector shape is of a thin material formed into a semicircular shape and the collectors have perforations allowing air to move through the collectors.

8. The solar air heater of claim 1 wherein the collectors are generally flat and have openings to allow air to move through the collector; and the spacing of the front film from the back film is adjustable so that the front film and back film can contact the collector independent of the angle of the collector to the front and back films.

9. The solar air heater of claim 8 wherein a surface of the collectors facing the solar radiation has a series of tapered fins that have tapered sides.

10. The solar air heater of claim 8 wherein the collectors are attached to and pivot on the back film plane.

11. The solar air heater of claim 1 wherein each of the collectors are cylindrical and have a plurality of tapered fins spaced apart on a longitudinal axis of the collector to allow air to move through each collector between the fins and the front and back films.

12. The solar air heater of claim 1 wherein the collectors are arranged in a vertical series and each of said collectors is mechanically connected to an adjacent collector such that said collectors are adjustable in orientation about the collector longitudinal axis to the solar radiation in unison.

13. The solar air heater of claim 12 wherein the collectors are adjustable by motorized means to align the collectors at an angle to the sun.

14. The solar air heater of claim 1 wherein the collectors are made from a solar absorbent material or coated with a solar radiation absorbing material, and the collectors are made of a material sufficiently rigid to maintain a shape and position.

15. The solar air heater of claim 1 wherein a tube is mounted to the first side of each collector, each of the tubes connecting to an adjacent tube on an adjacent collector forming a series of tubes, the series of tubes having an exit and an entrance into the solar air heater; the series of tubes carrying a liquid to be heated by thermal conduction from the collectors and thermal convection from the air flow.

* * * * *